United States Patent [19]

Read

[11] Patent Number: 5,602,526
[45] Date of Patent: Feb. 11, 1997

[54] VEHICLE OPEN DOOR WARNING SYSTEM

[76] Inventor: Robert M. Read, 2716 NE. 168th Ave., Vancouver, Wash. 98684

[21] Appl. No.: 342,806

[22] Filed: Nov. 21, 1994

[51] Int. Cl.$^6$ .................................................. B60Q 1/00
[52] U.S. Cl. ..................... 340/457; 340/425.5; 340/540; 340/547; 340/545; 362/80; 362/183; 116/28 R
[58] Field of Search ............................. 340/457, 425.5, 340/430, 431, 540, 547, 545, 568; 362/61, 80, 81–83, 83.3, 183; 116/28 R

[56] References Cited

U.S. PATENT DOCUMENTS

| | | | |
|---|---|---|---|
| 3,426,166 | 2/1969 | Canceill | 340/547 |
| 3,564,497 | 2/1971 | Gazzo . | |
| 3,924,558 | 12/1975 | Di Grazia | 116/28 R |
| 4,904,998 | 2/1990 | Niimi | 340/908 |
| 5,193,895 | 3/1993 | Naruke et al. | 362/80 |

*Primary Examiner*—Donnie L. Crosland
*Attorney, Agent, or Firm*—Marger, Johnson, McCollom & Stolowitz, P.C.

[57] ABSTRACT

An open door warning system for a vehicle includes an open door detector mounted on the vehicle, which detects when the door is left open, and a light module mounted on a side of the vehicle and operatively coupled to the detector. The light module is preferably aligned with a driver side rear view mirror so that the driver can view the light module through the rear view mirror. The light module includes a light source which is driven by the detector to generate a flashing warning light when the door is left open. This warning light can be seen by the driver through the rear view mirror and thereby be warned of the open door situation. The detector includes a magnetically actuated switch controlled by a magnet attached to a top edge of the door. The switch is mounted on the vehicle to be juxtaposed to the magnet when the door is closed. The switch is coupled to a power module which includes a light driver circuit, a rechargeable battery pack, and a solar cell to keep the battery pack charged. The light driver circuit is coupled to the light module to transmit a warning signal thereto, which in turn causes the light module to flash.

16 Claims, 2 Drawing Sheets

VEHICLE OPEN DOOR WARNING SYSTEM

BACKGROUND OF THE INVENTION

This invention relates generally to trucks or vans and more particularly to warning devices therefor.

A frequent and potentially dangerous problem can occur when a rear door of a vehicle such as a van or truck is left open. If the door is left open during transit, any cargo held in the vehicle can fall out through the rear door and damage cargo or, more seriously, injure other drivers. Several solutions have been proposed to warn the vehicle driver when the rear door is left open. One solution provides a mechanical arm that swings down from a rear side of the vehicle when the rear door is fully closed. An example of this type of warning device can be found in U.S. Pat. No. 3,924,558. In these mechanical warning devices, the arm typically includes a reflector or other highly visible portion which can be seen by the driver in his rear view mirror when the door is open. A problem with this mechanical approach is that the arm tends to take a lot of abuse with the opening and closing of the door as well as due to impact with cargo bays.

Another solution is to wire an indicator light up to the dashboard of the vehicle. The indicator light is then driven by a detector of some sort that detects when the door is open. Although this solves the reliability problems of the mechanical indicator, it suffers from several problems of its own. The first problem is that the indicator light must be installed in the dashboard of the vehicle. This can be a laborious process, typically requiring several hours of labor. This drives up the cost of the indicator system and, therefore, makes it less desirable. Another problem with this approach is that wiring must be run from the dashboard all the way to the rear of the vehicle. This can be problematic for vehicles that have separate, detachable trailers. In that case, a wiring harness of some sort must be used to allow the indicator light wiring to be connected and unconnected when the trailer is detached. This again increases the cost of this indicator. A further problem with this indicator system is that the indicator light can easily be overlooked in a busy dashboard. Typically, dashboards have a multiplicity of lights, dials and displays. As a result, the driver can come to ignore this indicator light amidst the noise of all the other devices in the dashboard.

One solution has been to add an audio indicator which buzzes when an open door is detected. The problem with this approach is that it presents a nuisance when the driver is unloading cargo and must have the rear door open. To deal with this nuisance the driver is forced to shut the vehicle off, which can cost the driver valuable time in restarting and warming up the vehicle.

Accordingly, a need remains for an open door warning system that does not suffer from the problems and limitations of the prior art.

SUMMARY OF THE INVENTION

A vehicle open door warning system which does not suffer from the aforementioned problems and limitations is described herein. The warning system includes an open door detector mounted on the vehicle which detects when the door is left open. A light module is mounted on a side of the vehicle and is operatively coupled to the detector. The light module is preferably aligned with a driver side rear view mirror so that the driver can view the light module through the rear view mirror. The light module includes a light source which is driven by the detector to generate a flashing warning light when the door is left open. This warning light can be seen by the driver through the rear view mirror and thereby be warned of the open door situation.

The detector, according to the invention, includes a magnetically actuated switch controlled by a magnet attached to a top edge of the door. The switch is mounted on the vehicle to be juxtaposed to the magnet when the door is closed. The switch is coupled to a power module that includes a light driver circuit, a rechargeable battery pack, and a solar cell to keep the battery pack charged. The light driver circuit is coupled to the light module to transmit a warning signal thereto, which in turn causes the light module to flash. In the preferred embodiment, the light module produces a concentrated flashing red beam responsive to the warning signal produced by the light driver circuit.

In operation, when the door is open, the magnet moves away from the magnetically actuated switch thereby causing the switch to close. The closing of the switch causes the light driver circuit to generate the warning signal, which causes the light module to emit the flashing warning light. When the door is closed, the magnet is aligned with the magnet actuated switch thereby causing the switch to open. The opening of the switch causes the light driver circuit to cease transmission of the warning signal to the light module.

An advantage of the present invention is the ease of installation.

Another advantage of the present invention is that the focused warning light alerts only the driver.

A further advantage of the present invention is that all of the components are solid state and therefore are highly reliable.

A yet further advantage of the present invention is that the warning light is highly visible, even in direct sunlight.

A yet further advantage of the present invention is that the entire system is mounted on the vehicle where normal loading/unloading cannot damage the system.

A yet further advantage of the present invention is that the system is completely maintenance free for an extended period of time.

The foregoing and other objects, features and advantages of the invention will become more readily apparent from the following detailed description of a preferred embodiment of the invention which proceeds with reference to the accompanying drawings.

DETAILED DESCRIPTION

Figure 1:
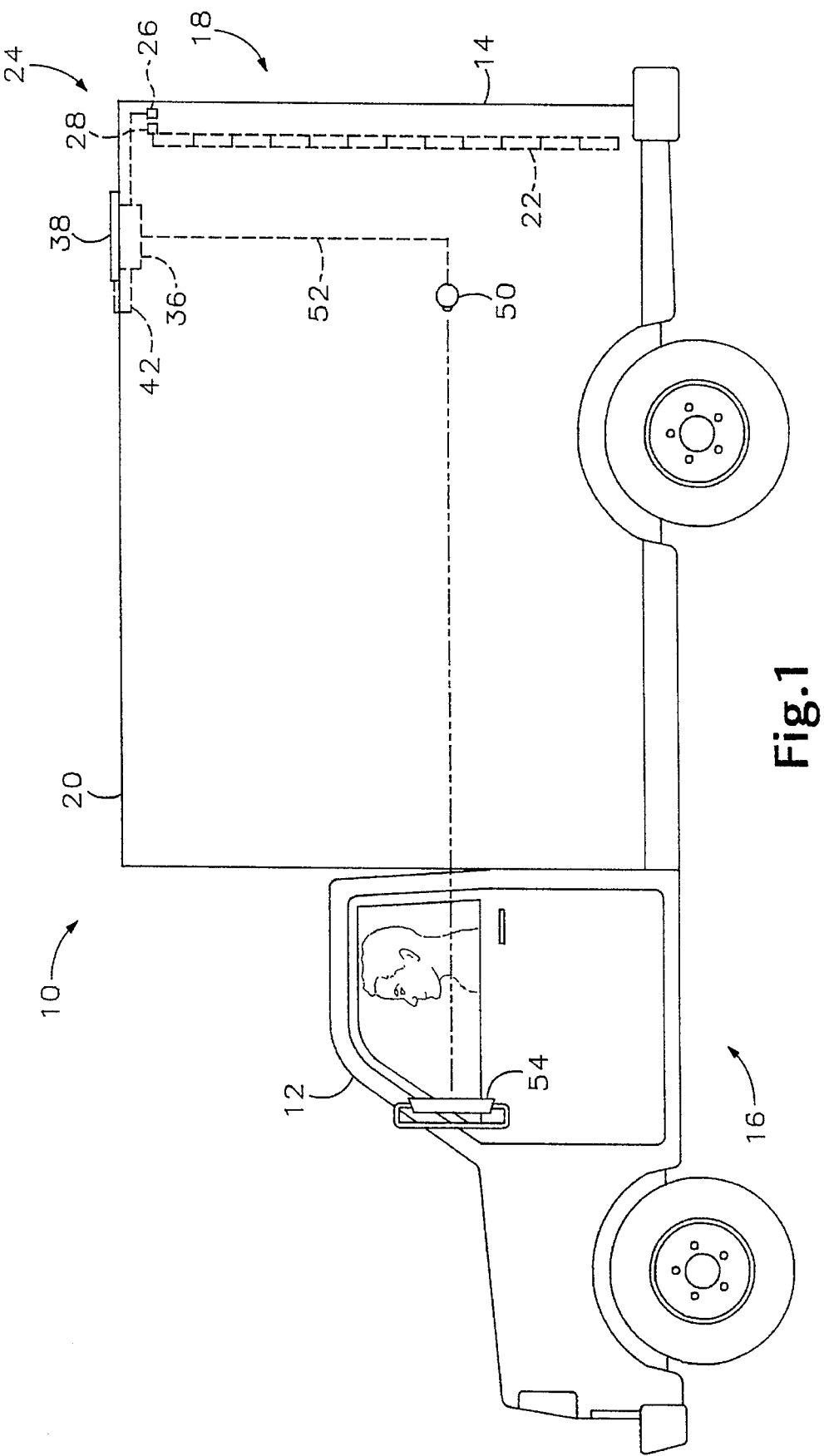
FIG. 1 is an elevation view of a vehicle including the warning system of the present invention.

Referring now to FIG. 1, a vehicle having a warning system according to the invention is shown generally at 10. The vehicle includes a cab portion 12 and a trailer portion 14 connected thereto. The trailer portion 14 is fixedly connected to the cab portion 12 as in a van. Alternatively, the trailer portion can be pivotally connected to the cab portion 12 as in a large truck. Both of these configurations is included within the term vehicle as used herein.

The vehicle 10 has both a driver side 16, as shown in FIG. 1, and a passenger side 18, not visible in FIG. 1. These sides extend lengthwise along the vehicle. Thus, the cab portion 12 includes both a driver side and a passenger side, as does the trailer portion 14. The trailer portion 14 also includes a roof 20 connected between the driver and passenger sides thereof. The trailer portion 14 further includes a roll-up door 22 which is slidably mounted on the trailer portion 14. Although the invention is described herein with reference to a roll-up door, as shown in FIG. 1, the invention can be applied to other door types, e.g., hinged doors, as will be apparent to those skilled in the art based on the description contained herein.

A warning system, according to the invention, is shown generally at 24. The warning system includes a sensor 26 mounted on the trailer portion for detecting opening of the door 22. In the preferred embodiment, the sensor is a magnetically actuated switch 26 that is normally closed. The switch 26 opens responsive to a magnetic field detected thereby. A magnetic actuator 28 is mounted on a top edge of the door 22 to provide that magnetic field. The magnetic actuator (or simply "magnet") 28 is juxtaposed to the switch 26 when the door 22 is completely closed. When the door is closed, the magnetic field generated by the magnet 28 causes the switch 26 to open. As shown in FIG. 1, the magnet 28 is offset from the switch 26 because the door 22 is partially open.

Figure 2:
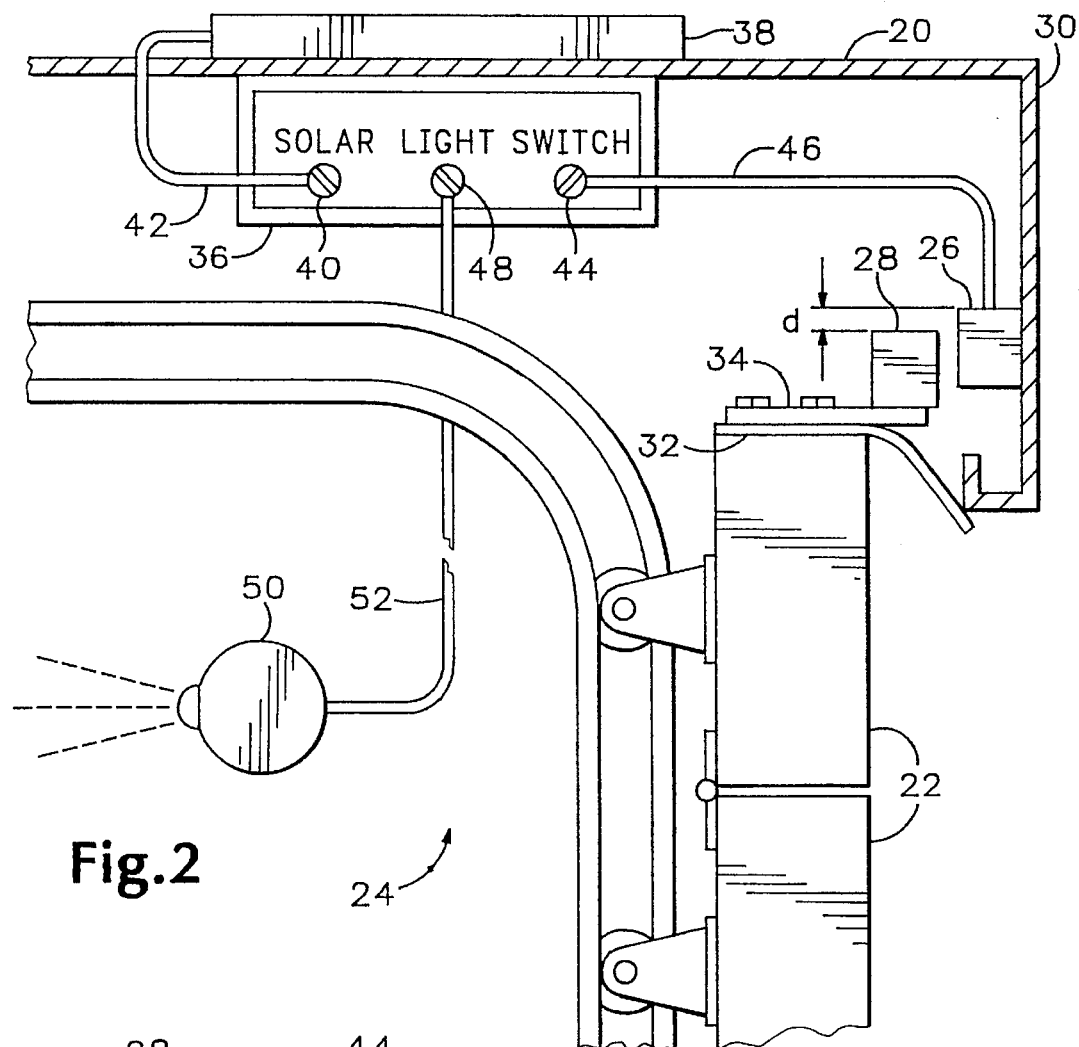
FIG. 2 is a diagram of the warning system of FIG. 1.

The relationship between the switch 26 and the magnet 28 can be more clearly seen with reference to FIG. 2. In FIG. 2, the switch 26 is mounted on an inside face of an outer wall 30. The magnet 28 is mounted on a top edge 32 of the door 22 by a mounting bracket 34. The mounting bracket 34 places the magnet 28 in close proximity to the switch 26 in order that the switch 26 will detect a sufficient magnetic field to actuate the switch. As can be seen in FIG. 2, the switch 26 is offset from the magnet 28 by a predetermined amount (d). This offset allows the door 22 to bounce without causing the switch 26 to close.

The warning system 24 also includes a power module 36 and a solar cell 38 coupled thereto. The power module 36 is mounted on an interior side of the roof 20 while the solar cell 38 is mounted on an exterior side of the roof. The solar cell 38 is coupled to a first input 40 of the power module 36 via conductor 42. The conductor 42 includes one conductor for transmitting current from the solar cell 38 to the power module. The power module 36 includes a second input 44 which is coupled to the switch 26 by conductors 46. The conductor 46 are coupled to the two sides of the switch, respectively. The power module 36 further includes a third input 48 which is coupled to a light module 50 via a pair of conductors 52. The pair 52 includes one conductor for transmitting a warning signal and the other for a ground line.

The light module 50, as shown in FIG. 1, is mounted on the driver side of the trailer portion 14. In the preferred embodiment, the light module 50 is aligned with a rear view mirror 54, mounted on the driver side of the cab portion 12. The light module produces a flashing warning light that can be seen by the driver through the rear view mirror 54. In the preferred embodiment, the light module includes a gallium arsenide light emitting diode (LED) that is mounted on the exterior of the trailer portion by a screw or similar attachment means. The module 50 also includes a plastic sleeve that covers the LED and focuses the light emitted thereby. The power module 36 transmits a pulsating warning signal to the light module 50, over conductors 52, thereby producing a flashing warning light. In the preferred embodiment, this light is a flashing concentrated red light. The intensity and frequency of the flashing warning light can be readily varied by modifying the power module.

Figure 3:
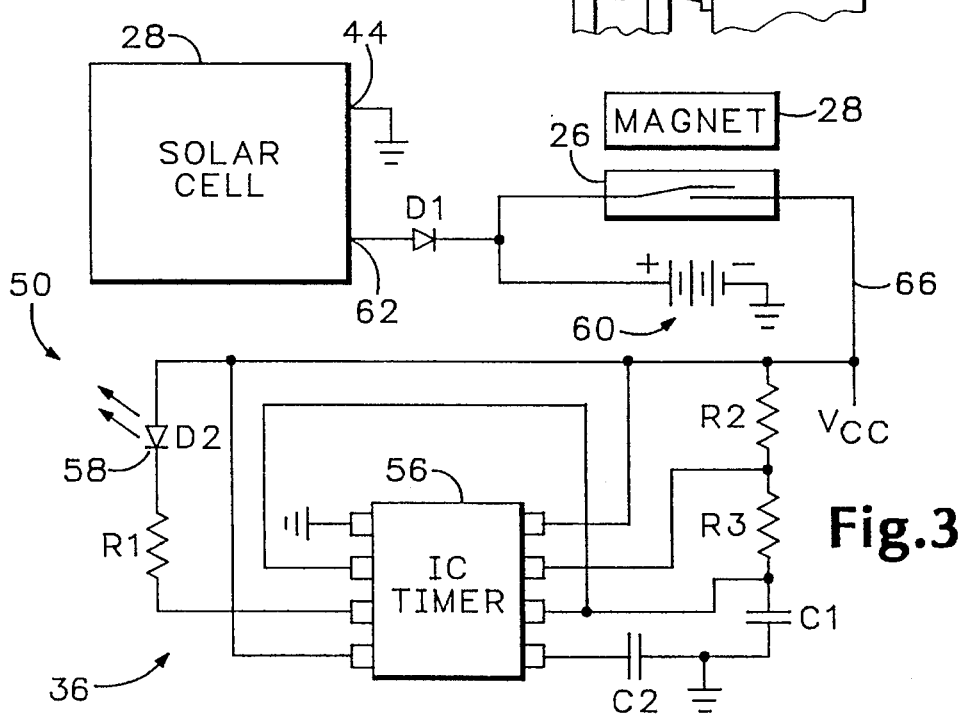
FIG. 3 is a schematic of the power module of FIGS. 1 and 2.

Referring now to FIG. 3, a schematic of the power module 36 is shown along with the other components of the warning system. The power module includes a timer circuit 56, which produces the warning signal that drives the light module 50 coupled thereto. The timer circuit 56, in the preferred embodiment, is a Phillips 555 timer. The pulse rate or frequency of the warning signal is determined by a plurality of discrete components coupled to the timer circuit 56. These components include resistors R2 and R3 and capacitors C1 and C2. In the preferred embodiment, these components are chosen to produce a warning signal frequency of 2 Hertz, i.e., two flashes per second.

As described above, the light module 50 includes a light emitting diode (LED) 58 and a resistor R1 connected in series therewith. In the preferred embodiment, the LED 58 is a gallium arsenide LED part no. LN261CAL (UR) manufactured by Panasonic. This LED produces a high intensity warning light with very little power. The preferred LED produces a red warning light, however, other bright colors can alternatively be used. In addition, other light sources can be substituted in place of the LED 58.

The power module 36 also includes a rechargeable battery 60 coupled to a positive terminal 62 of the solar cell 28 via a diode D1. The solar cell 28 includes a negative terminal 64 that is connected to a ground. The current produced by the solar cell 28 recharges the battery 60. In the preferred embodiment, the battery 60 includes three NiCad batteries, part no. P116ND manufactured by Panasonic. These batteries produce a voltage between approximately 2.5–3.5 volts DC. This voltage is supplied to both the timer circuit 56 and the LED 58 via line 66.

In operation, the switch 26 is normally closed. When the switch 26 is closed, the battery voltage is provided to the timer circuit 56 and to the LED 58. The timer circuit, in turn, generates a warning signal that drives the LED 58 to produce a warning light, which is visible by the driver. As described above, the switch remains closed until the magnet 28 is brought in proximity thereto. This condition occurs when the door 22 is open.

When the magnet 28 is brought into proximity to the switch 26, switch 26 is actuated thereby. Actuating the switch 26 causes an open circuit between the battery 60 and the timer circuit 56. As a result, no warning signal is provided to the LED 58. Thus, when the magnet is aligned with the switch 26 the LED 58 does not generate a warning light. This condition occurs when the door is fully closed. Therefore, the warning system as described herein provides a warning light to the driver only when the door is detected open.

Having described and illustrated the principles of the invention in a preferred embodiment thereof, it should be apparent that the invention can be modified in arrangement and detail without departing from such principles.

I claim all modifications and variation coming within the spirit and scope of the following claims:

1. A warning device for a vehicle having a cab portion and a trailer portion with a door mounted thereon, the warning device comprising:

an open door detector mountable proximate to the door that generates an open door signal responsive to the door being opened, the open door detector including:
a sensor mountable on the trailer portion;
an actuator mountable on the door; and
a power supply coupled to the sensor, the power supply including a power module and a solar cell mountable on a roof of the trailer portion and being coupled to the power module for supplying current thereto; and a light module mountable on a side of the trailer portion and operatively coupled to the open door detector to receive the open door signal, the light module emitting a warning light responsive to the open door signal, the warning light directed toward the cab portion so that the warning light is visible to a driver of the vehicle.

2. A warning device for a vehicle according to claim 1 wherein the sensor includes a magnetically actuated switch.

3. A warning device for a vehicle according to claim 2 wherein the actuator includes a magnet.

4. A warning device for a vehicle according to claim 1 wherein the actuator is mountable on a top edge of the door juxtaposed to the sensor when the door is closed.

5. A warning device for a vehicle according to claim 1 wherein the power module includes:

a charging circuit coupled to the solar cell; and a rechargeable battery coupled to the charging circuit.

6. A warning device for a vehicle according to claim 1 wherein the light module includes:

a light emitting diode mountable on the trailer portion; and a sleeve encasing the diode.

7. A warning device for a vehicle according to claim 6 wherein the light emitting diode includes a gallium arsenide light emitting diode.

8. A vehicle comprising:

a cab portion having a driver side for receiving a driver and having a passenger side;

a trailer portion having a driver side, a passenger side, a roof, and a rear door mounted on the trailer portion;

an open door detector mounted proximate to the door that generates an open door signal responsive to the door being opened, the open door detector including:
  a sensor mountable on the trailer portion;
  an actuator mountable on the door; and
  a power supply coupled to the sensor, the power supply including a power module and a solar cell mountable on a roof of the trailer portion and being coupled to the power module for supplying current thereto; and a light mounted on one side of the trailer portion and operatively coupled to the open door detector to receive the open door signal, the light emitting a warning light responsive to the open door signal, the warning light being visible to the driver of the vehicle to warn the driver of the open door.

9. A vehicle according to claim 8 wherein the cab portion includes a rearview mirror mounted on the driver side, and wherein the light is mounted on the driver side of the trailer portion so that the light is horizontally aligned with the rearview mirror.

10. A vehicle according to claim 8, wherein the light is a light emitting diode.

11. A vehicle according to claim 8 wherein the light generates a flashing warning light responsive to the open door signal.

12. A method of warning a vehicle driver of a rear door being open, the method comprising:

mounting an actuator on the door;

mounting a sensor on the vehicle proximate to the door, the sensor being actuated responsive to the actuator when the door is in a closed position;

coupling the sensor to a power module, the power module generating a warning signal responsive to actuation of the sensor;

coupling a solar cell to the power module for supplying current thereto:

generating a warning signal responsive to actuation of the sensor; and generating a warning light on a side of the vehicle responsive to the warning signal, the warning light being visible by the driver to warn the driver of the open door.

13. A method of warning a vehicle driver of a rear door being open according to claim 12, wherein the step of generating a warning light on a side of the vehicle includes:

mounting a light source on the side of the vehicle;

coupling the light source to the power module to receive the warning signal therefrom; and generating the warning light responsive to the warning signal.

14. A method of warning a vehicle driver of a rear door being open according to claim 13 wherein the step of mounting a light source on the side of the vehicle includes aligning the light source with a vehicle rearview mirror.

15. A method of warning a vehicle driver of a rear door being open according to claim 12, wherein the step of generating a warning light on a side of the vehicle responsive to the detected open door includes generating a flashing warning light on the side of the vehicle.

16. A method of warning a vehicle driver of a rear door being open according to claim 12 wherein the step of generating a warning light on a side of the vehicle responsive to the detected open door includes generating a red warning light on the side of the vehicle.

* * * * *